United States Patent [19]

de Bruyn

[11] Patent Number: 4,535,217

[45] Date of Patent: Aug. 13, 1985

[54] METHOD FOR THE PREVENTION OF ARCING IN A SPARK EROSION PROCESS

[75] Inventor: Hendrik E. de Bruyn, Delft, Netherlands

[73] Assignee: Stichting Steunfonds Laboratorium voor Werkplaatstechniek en Organisatie van de Technische Hogeschool Delft, Delft, Netherlands

[21] Appl. No.: 516,144

[22] Filed: Jul. 21, 1983

[30] Foreign Application Priority Data

Jul. 22, 1982 [NL] Netherlands .......................... 8202964

[51] Int. Cl.³ .............................................. B23P 1/08
[52] U.S. Cl. ................... 219/69 M; 219/69 P; 219/69 S
[58] Field of Search ................ 219/69 V, 69 S, 69 M, 219/69 P, 69 C

[56] References Cited

U.S. PATENT DOCUMENTS 3,705,287 12/1972 Saito et al. ........................ 219/69 P
3,812,317  5/1974 De Bont et al. .................. 219/69 P
3,916,138 10/1975 Pfau ................................... 219/69 P
3,999,028 12/1976 Saito et al. ........................ 219/69 P

FOREIGN PATENT DOCUMENTS 1074139  6/1967  United Kingdom ............. 219/69 P

Primary Examiner—M. H. Paschall
Attorney, Agent, or Firm—Winburn & Gray, Ltd.

[57] ABSTRACT

A method for the prevention of arcing in a spark erosion process, in which a pulse-shaped voltage is applied across an electrode and a workpiece, which voltage has a first predetermined value during a variable ignition retarding period determined by the process parameters, and on the termination of this ignition retarding period a discharge takes place between the electrode and the workpiece, resulting in the flow of a pulse-shaped current and in the voltage dropping in absolute sense to a second value determined by the process. The method comprises the additional steps of determining whether the voltage pulse satisfies a predetermined criterion and discontinuing voltage pulses failing to satisfy this criterion.

6 Claims, 5 Drawing Figures

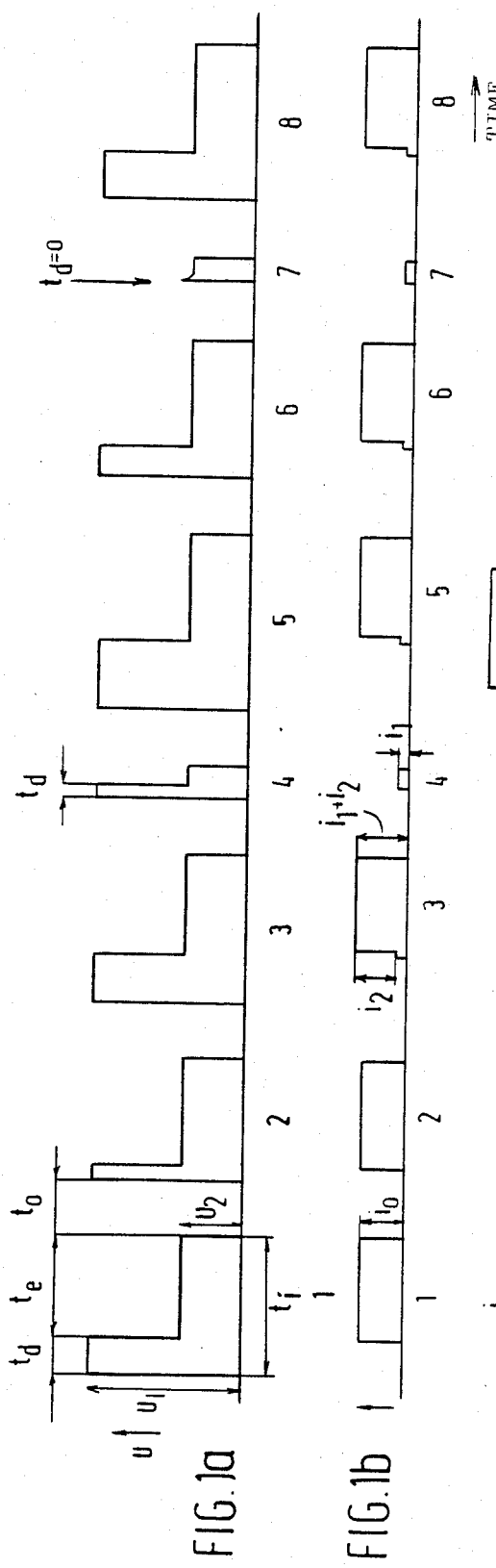
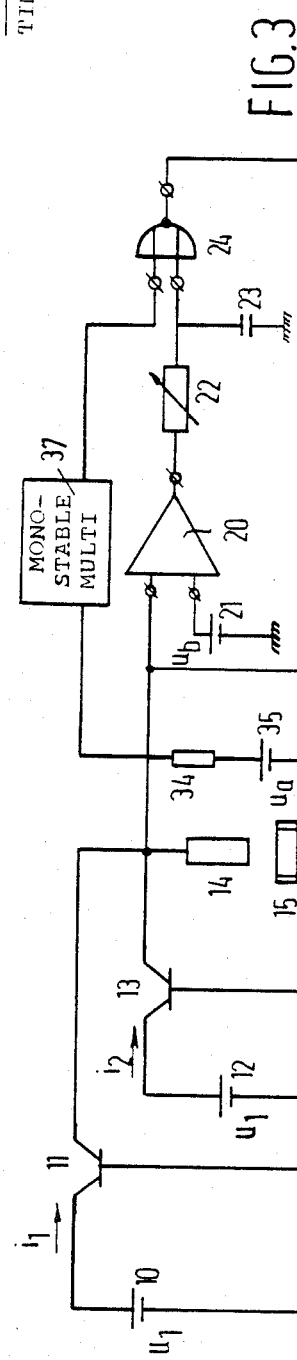
FIG.1a
FIG.1b
FIG.3

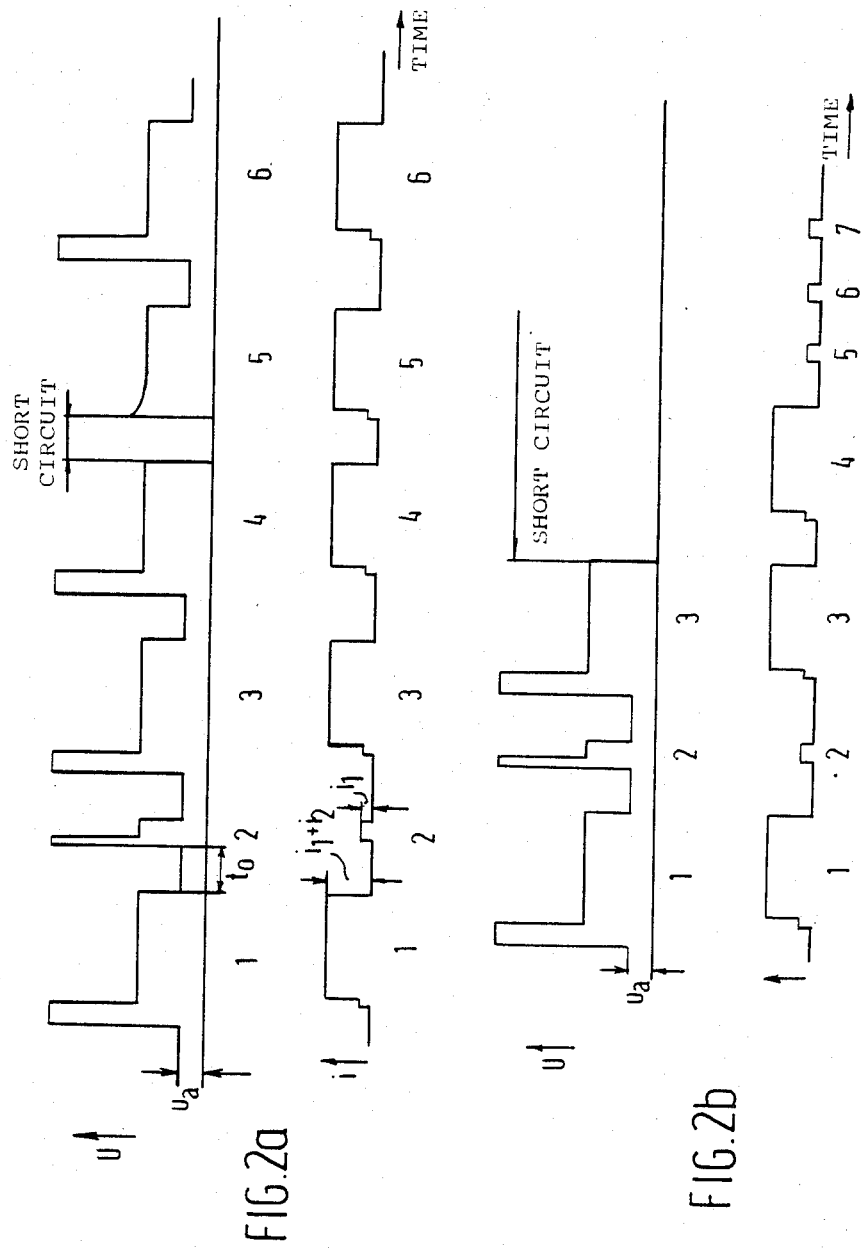

METHOD FOR THE PREVENTION OF ARCING IN A SPARK EROSION PROCESS

The invention relates to a method for the prevention of arching in a spark erosion process, in which a pulse-shaped voltage is applied across an electrode and a workpiece, which voltage has a first, predetermined value during a variable ignition retarding period determined by the process parameters, and on the termination of this ignition retarding period a discharge takes place between the electrode and the workpiece, resulting in the flow of a pulse-shaped current and in the voltage dropping in absolute sense to a second value determined by the process.

In a spark erosion process a pulse-shaped voltage is applied across an electrically conductive electrode and an electrically conductive workpiece. An electrically non-conductive liquid, the dielectric, is present between the electrode and the workpiece. Some time after the pulse-shaped voltage has reached a first value, a discharge takes place between the electrode and the workpiece. The period of time elapsing before the occurrence of the discharge is determined by, inter alia, the spacing between electrode and workpiece, the concentration of the electric field on convex portions of electrode and workpiece and also the degree of contamination of the dielectric, and is called the ignition retarding period.

The electrical energy of the discharge is dissipated in the workpiece material and the resultant, extremely high temperature occurring at the discharge location causes the workpiece material to melt and evaporate at this location, thereby forming a crater. The electrode material is likewise heated by the discharge but the resultant, undesirable electrode consumption can be kept to a minimum by, for example, choosing an appropriate electrode material. The material removed is carried off by the dielectric being circulated.

When repeating the application of a voltage across the electrode and the workpiece, normally the discharge will take place at a location different from that where the previous discharge occurred, thereby forming by erosion a new crater. Consequently, by applying the pulsed voltage the workpiece material can be machined in the aforesaid manner, resulting in the formation of a pattern in the workpiece material having a shape complementary to that of the electrode.

A proper execution of the spark erosion process requires the dielectric in the spacing between electrode and workpiece, the spark gap, to be continuously renewed to ensure that successive discharges will each time take place at different locations. However, there are circumstances in which there nevertheless is a chance of a discharge occurring at the same location as the previous one. Such a circumstance may be that the erosion process in question does not allow clean liquid to be applied through a central duct in the electrode, the so-called central rinsing. It is assumed that thermal emission of the electrode occurs due to insufficient cooling, which emission initiates the discharge at the same location as that of the previous one. Such a second discharge at the location of the previous one may be the beginning of a stable condition in which all subsequent discharges take place in the same channel, resulting in substantial damage being done to workpiece and electrode. This phenomenon is called arcing.

Once such a stable arcing condition has arisen, it is difficult to cancel the arc formed by the means normally used for adjusting the width of the spark gap. During operation, the spark gap will normally have a width of 0.01–0.1 mm, whereas arc cancellation may require the gap width to be increased to as far as 10 mm.

Moreover, when using an organic dielectric there is a danger of a new arc being formed in immediate response to restoring the original width of the spark gap. This may be the result of the previous arc having caused carbon to be deposited onto the discharge locations on the workpiece and the electrode, with new arc being immediately formed between these locations.

It is therefore an object of the invention to provide a method for preventing the formation of an arc between electrode and workpiece, to which end in accordance with the invention a method of the above type comprises the additional steps of determining whether the voltage pulse satisfies a predetermined criterion and discontinuing voltage pulses failing to satisfy this criterion.

In accordance with a preferred embodiment of the invention, the predetermined criterion to be satisfied by the voltage pulse is the duration of the ignition retarding period, pulses exhibiting a too short ignition retarding period being discontinued.

The invention is based on the insight that voltage pulses initiating the occurrence of a discharge along a new path, as required for a proper spark erosion process, will differ from voltage pulses initiating the occurrence of a discharge along the same path as that of the previous discharge. The difference between the voltage pulses in the respective situations resides in, for example, a difference in the ignition retarding periods exhibited by the pulses. The value of a voltage pulse will first rise to a first level and remain at this level for a period of time until the discharge takes place and, as a result thereof, the voltage drops to a second level determined by the spark erosion process, which second level is lower than the first level in absolute sense. The ignition retarding period is variable and depends upon the different process parameters. It has appeared that the occurrence of arcing will always be accompanied by an ignition retarding period that is shorter than a period defined by the process parameters, which period by itself is shorter than the average ignition retarding period. Consequently, by measuring the duration of the ignition retarding period exhibited by each pulse, pulses having an ignition retarding period shorter than the period defined by the process parameters, which latter period can be determined in advance, can be detected and subsequently eliminated, so that no discharge can take place along the path of the previous discharge, thereby fully preventing the occurrence of arcing.

It has further appeared that spark erosion processes often entail the occurrence of shortcircuits between electrode and workpiece during the intervals between the pulses. Such shortcircuits are cancelled by the next successive pulse. This next successive pulse, however, will exhibit an ignition retarding period equal to zero as a result of the shortcircuit, so that in the method according to the invention this pulse will surely be eliminated. As a result, the harmless shortcircuit during the pulse interval can, for lack of cancellation, change into a prolonged shortcircuit that is harmful indeed, which shortcircuit can only be interrupted by increasing the spark gap. In a preferred embodiment, the method according to the invention therefore renders it possible to determine during each pulse interval whether a short-circuit between electrode and workpiece occurs, while, if so, the next successive pulse is allowed to fully develop, irrespective of the ignition retarding period exhibited thereby, so that a normal discharge can take place.

The method according to the invention is particularly useful in spark erosion processes in which the average ignition retarding period is considerably longer than the preset ignition retarding period and in which pulses exhibiting that ignition retarding period or a shorter ignition retarding period are to be eliminated. In such a situation the loss of pulses is negligible. Longer ignition retarding periods will occur in spark erosion processes involving a relatively large spark gap, as will be the case in processes allowing no central rinsing of the dielectric and hence, as stated above, running a substantial risk of arcing.

An embodiment of the invention will now be described, by way of example, with reference to the accompanying drawing, in which:

FIGS. 1a and 1b a sequence of voltage and current pulses as occurring in a known spark erosion process and in the method according to the invention;

FIGS. 2a and 2b a second sequence of voltage and current pulses as may occur in a variant of the method according to the invention; and FIG. 3 shows a block diagram of an embodiment of a circuit arrangement for controlling the spark erosion process in the manner of the invention.

It is emphasized that although hereinafter the ignition retarding period is described as the criterion determining whether or not a voltage pulse will initiate a complete discharge, it is also possible to select other criteria on the basis whereof it is determined whether or not a voltage pulse is to be discontinued.

FIG. 1a shows a sequence of voltage pulses 1–8 and FIG. 1b shows a sequence of associated current pulses 1–8. The voltage pulses occur at a pulse interval $t_0$. The pulses are generated by means of a pulse generator known in the art, by means whereof the duration and the power of the discharges can be set. In a fine machining process the duration of a discharge is approximately 10 $\mu$sec and in a coarse machining process approximately 500 $\mu$sec. It is observed that the pulse forms shown in FIG. 1 are merely for the purpose of illustration and that the invention is by no means limited to rectangular pulses but that, for example, trapezoidal pulses or otherwise shaped current or voltage pulses may likewise be used.

FIGS. 1a1 and 1b1 show the voltage and current pulse in a conventional spark erosion process. The voltage u in FIG. 1a1 first rises to a value $u_1$ defined by the generator setting and maintains this value $u_1$ during a variable ignition retarding period $t_d$ determined by the process parameters in the spark gap. During period $t_d$ such an electric field will build up in the spark gap that a discharge can take place at the end of this period. The voltage $u_1$ then drops to a value $u_2$ determined by the process and a current pulse having a value i occurs for the duration of the discharge. The total duration of the voltage pulse is $t_i$ and the duration of the current pulse is $t_e = t_i - t_d$.

FIG. 1a2 again shows a voltage pulse in a conventional spark erosion process, the ignition retarding period $t_d$ exhibited by this pulse, however, being shorter than that of the previous pulse. It has appeared that such a pulse can initiate a discharge in the same discharge channel as that in which the previous discharge occurred. If the method according to the invention is not applied, the pulse of FIG. 1a2 will cause a current pulse again having a value $i_0$ and a duration $t_e$, as shown in FIG. 1b2. The next successive pulse may again have the form of the pulse shown in FIG. 1a2 and initiate a discharge in the previous discharge channel, as a result whereof a stable arc can occur.

In accordance with the invention, voltage pulses having a form as shown in FIG. 1a2, which exhibit an ignition retarding period shorter than a preset one, will be suppressed, thereby eliminating the risk of a discharge taking place in the discharge channel of a previous discharge and hence preventing the occurrence of arcing.

In order to allow measurement of the ignition retarding period exhibited by a voltage pulse, there is provided an electronic circuit measuring the duration of the period $t_d$ and, in response to the duration measured exceeding a predetermined value, producing a signal allowing the voltage and current pulse, respectively, to further develop in the normal manner. Self-evidently, the duration of the period $t_d$ will only be known at the instant the current pulse is being formed and a discharge is already taking place. To prevent the current pulse from nevertheless initiating a condition of arcing via a discharge already during the brief period of time required for measuring the duration of period $t_d$, in the embodiment described the current i is switched on in two phases. During the first phase an initial current having a relatively low value $i_1$ insufficient for initiating an arc will flow while, under normal operating conditions, shortly thereafter the current will increase by a value $i_2$ considerably largely than $i_1$. The resultant current pulse is shown in FIG. 1b3.

When the current for measuring the duration of period $t_d$ determines that this period $t_d$ is shorter than the predetermined value, the switching on of the current $i_2$ is inhibited as the voltage pulse is discontined, resulting in the current $i_1$ being cancelled after a very brief period of time too. In the event of a normal spark discharge, the duration of the current pulse having value $i_1$ will be, for example, less than 1 $\mu$sec and in the event of a discontinued pulse less than 2 $\mu$sec, the latter, longer period being the result of retardation phenomena occurring when switching off relatively large voltages and currents.

The voltage and current pulses 3–8 in FIG. 1 are pulses as may occur in the method according to the invention. The voltage pulse 3 in FIG. 1a exhibits a sufficiently long ignition retarding period $t_d$ and initiates a discharge at a current $i_1 + i_2$. The voltage pulse 4 exhibits a too short ignition retarding period $t_d$ and is discontinued, resulting in the occurrence of only a brief current pulse 4 having the low value $i_1$ insufficient for initiating an arc. The voltage pulses 5 and 6 of FIG. 1a again exhibit a sufficiently long ignition retarding period and initiate a discharge by means of current pulses 5 and 6. The voltage pulse 7 is a pulse occurring in the event of short-circuit between the electrode and the workpiece. Such a pulse exhibits no ignition retarding period at all and is hence eliminatd. The particular properties of the short-circuit pulses will be discussed in greater detail hereinafter. Voltage pulse 8 has a sufficiently long ignition retarding period $t_d$ and again initiates a normal discharge via current pulse 8.

It has appeared that in spark erosion processes short-circuits may occur between the electrode and the workpiece during the intervals $t_0$ between the pulses. The pulse occurring directly after such a shortcircuit will cancel this shortcircuit. Only in a very small number of cases, the pulse produced after a pulse interval during which shortcircuit occurs will be a real shortcircuit pulse having a voltage value equal to zero. Such a real short-circuit pulse may be the beginning of a condition of permanent shortcircuit between electrode and workpiece, which condition can only be cancelled by increasing the width of the spark gap. The aforesaid shortcircuits that are limited to the pulse interval are followed by a pulse that is no real shortcircuit pulse, as this pulse cancels the shortcircuit during, for example, the first microseconds of its duration. However, this type of "clean-up pulse" commences in a situation in which there is a shortcircuit between electrode and workpiece and will therefore exhibit an ignition retarding period $t_d$ equal to zero. Should such a pulse be eliminated in accordance with the method of the invention, the unobservable shortcircuit occurring during the pulse interval would change into a real, prolonged short circuit that can only be cancelled by enlarging the spark gap. Consequently, a spark erosion process in which all pulses exhibiting an ignition retarding period shorter than a predetermined duration are eliminated is a process prone to conditions of permanent shortcircuit. Therefore, in accordance with a preferred embodiment of the invention all pulses exhibiting an ignition retarding period shorter than a preset duration except for the first pulse produced after the occurrence of a shortcircuit during a pulse interval, are eliminated. By measuring the resistance of the spark gap, it is possible to obtain information as to the occurrence of shortcircuit during the pulse interval, on the basis of which information the elimination of the first pulse produced after this interval can be prevented.

FIGS. 2a and 2b show sequences of voltage and current pulses as may occur in a variant of the method according to the invention. By connecting a DC voltage source of high series resistance between the electrode and the workpiece during the pulse interval $t_0$, the occurrence of shortcircuit can be detected. In the event of shortcircuit, a voltage drop across the resistance will occur, which can be used to prevent the next successive pulse from being eliminated.

In FIG. 2a voltage pulse 1 is a pulse exhibiting a sufficiently long ignition retarding period $t_d$, so that a normal current pulse 1 will occur. In the absence of short-circuit, the voltage $u_a$ will be present between electrode and workpiece during the interval $t_0$ following voltage pulse 1, so that the detection circuit to be described lateron will not respond. Voltage pulse 2 is a pulse exhibiting a too short $t_d$ and is eliminated in the same manner as the voltage pulse 4 in FIG. 1a, so that only a very brief current pulse 2 having a low value $i_1$ is produced. Voltage pulses 3 and 4 in FIG. 2a again have a sufficiently long $t_d$, so that normal current pulses 3 and 4 for a discharge occur. During the pulse interval following voltage pulse 4 a shortcircuit between electrode and workpiece occurs, so that the detection circuit does not detect a voltage across its resistance. Voltage pulse 5 following this shortcircuit exhibits an ignition retarding period $t_d$ equal to zero, but is not eliminated for the aforesaid reasons. Consequently, a normal discharge via current pulse 5 occurs. In the situation of FIG. 2a the discharge resulting from pulse 5 appears to have cancelled the shortcircuit and during the pulse interval after pulse 5 the detection circuit again detects the voltage $u_a$, so that the subsequent voltage pulse 6, which likewise exhibits a sufficiently long $t_d$, again initiates a discharge via current pulse 6.

FIG. 2b shows a sequence of voltage and current pulses in which the situation during pulses 1-3 corresponds to that during pulses 1-3 of FIG. 2a. A shortcircuit between electrode and workpiece occurs in the pulse interval following voltage pulse 3, so that the detection circuit detects no voltage between these elements. In the same manner as in the case of voltage pulse 4 of FIG. 2a, nevertheless a current pulse 4 occurs. However, this current pulse 4 appears incapable of cancelling the shortcircuit, so that the voltage between electrode and workpiece remains zero. The next voltage pulses all have zero value and self-evidently zero ignition retarding period, so that only brief current pulses 5-8 of very short duration and low current value occur. In this situation, the condition of shortcircuit can only be cancelled by enlarging the spark gap, i.e. in a mechanical way.

In the above manner a stable process is achieved, in which a shortcircuit occurring during a pulse interval and permitting cancellation by means of a single discharge is really cancelled indeed by allowing a single voltage pulse after such a shortcircuit, in spite of the too short ignition retarding period of that pulse. Only if it appears impossible to cancel the shortcircuit in question by means of a single discharge, the safety procedure according to the invention is actuated, resulting in an elimination of the subsequent voltage pulses.

FIG. 3 shows a block diagram of a circuit arrangement for performing the method according to the invention.

A first voltage source 10 adapted to produce the ignition voltage $u_1$ has its positive terminal connected to the emitter electrode of a PNP transistor 11 having its collector electrode connected to the electrode 14. Voltage source 10 has its negative terminal connected to ground and to the workpiece 15. Voltage source 10 can supply the relatively low current $i_1$ to electrode 14 through transistor 11. A second voltage source 12 likewise adapted to produce the ignition voltage $u_1$ has its negative terminal connected to ground and its positive terminal connected to the emitter electrode of a PNP transistor 13 having its collector electrode connected to electrode 14. Transistor 11 has its base electrode connected to the output terminal 33 of a monostable multivibrator 32 dimensioned to produce pulses of a duration $t_0$ in response to the reception of a starting signal at its input terminal 31. The pulses of duration $t_0$ have a polarity to render transistor 11 non-conducting. In the absence of the pulses of duration $t_0$, transistor 11 is conducting and the voltage $u_1$ from voltage source 10 is applied across the electrode and the workpiece, while at the same time the relatively low current $i_1$ can flow through transistor 11 and a discharge between electrode and workpiece can take place.

The ignition voltage is also applied to a first input terminal of a comparator 28 having its second input terminal connected to a DC voltage source 29 adapted to produce a voltage $U_c$. Voltage $U_c$ is selected to be higher than the ignition voltage $u_2$ and lower than the ignition voltage $u_1$. Comparator 28 thus produces a signal at its output terminal in response to the ignition voltage dropping from the value $u_1$ to the value $u_2$ upon the occurrence of a discharge. This output signal is applied to the starting input 26 of a second monostable multivibrator 25 adapted to produce pulses of a duration $t_e$ at a first output terminal thereof. This output terminal of monostable multivibrator 25 is connected to the base electrode of transistor 13. Monostable multivibrator 25 is dimensioned to render transistor 13 conducting only when the pulses of duration $t_e$ are produced, whereby the relatively high current $i_2$ can flow to electrode 14 through transistor 13 and a complete discharge can take place. Monostable multivibrator 25 includes a second output terminal at which, at the end of the pulse of duration $t_e$, a pulse is produced which is applied to the starting input of monostable multivibrator 32, in response to which pulse multivibrator 32 produces a pulse of duration $t_0$ to render transistor 11 non-conducting.

By means of the circuit arrangement described above, voltage and current pulses as shown in FIGS. 1$a$4 and 1$b$4 can be generated but additional components are required for accomplishing the suppression of pulses exhibiting a too short ignition retarding period $t_d$. A comparator 20 has a first input terminal connected to a DC voltage source adapted to produce a preset voltage $U_b$ selected to be higher than ignition voltage $u_2$ and lower than ignition voltage $u_1$, while the ignition voltage u is applied to the second input terminal of comparator 20. In response to the ignition voltage u exceeding the value $U_b$, an output voltage is produced at the output of comparator 20. This output voltage is applied through an adjustable resistor 22 to a first terminal of a capacitor 23 having its second terminal connected to ground. Depending upon the resistance set, after some time the capacitor 23 will have been charged to a voltage level sufficient to actuate a NOR-gate 24 having a first input terminal connected to capacitor 23, whereby an output signal is produced at the output terminal of the NOR-gate indicating that the ignition retarding period previously set by means of resistor 22 has been exceeded. When the ignition voltage drops from the first value $u_1$ to the value $u_2$ determined by the process, comparator 20 will no longer produce an output voltage, thereby inhibiting the further charging of capacitor 23. Should the ignition retarding period have been too short, capacitor 23 will not have been charged to a voltage level sufficient for the actuation of NOR-gate 24, so that the output terminal of this gate will not present the output signal required for permitting the further development of the voltage pulse and the occurrence of the discharge.

To suppress pulses exhibiting a too short $t_d$, NOR-gate 24 has its output terminal connected to a reset input terminal 27 of monostable multivibrator 25. In the absence of a signal at the input terminals of NOR-gate 24, an output voltage will be present at the output of this gate, which output voltage inhibits through terminal 27 the production of pulses of duration $t_e$. Only if a sufficiently high input signal is present at one of the input terminals of NOR-gate 24, the output voltage will drop to zero value and, through input terminal 27, monostable multivibrator 25 will be released for producing the pulses of duration $t_e$. It will be clear that, in the event of an ignition retarding period $t_d$ having a duration less than the value set by means of resistor 22, the circuitry described above will prevent monostable multivibrator 25 from producing an output pulse, thereby inhibiting the flow of the relatively high current $i_2$. Under the control of monostable multivibrator 32, only transistor 11 will each time be non-conducting for a duration $t_0$ and be conducting for the rest of the time, so that the ignition voltage from voltage source 10 is applied across electrode 14 and workpiece 15 and the current $i_1$ can flow. When a starting pulse is supplied to input terminal 26 of monostable multi-vibrator 25 but input 27 thereof is not released through the application of a reset signal thereto, multivibrator 25 will apply an output signal to starting input 31 of multivibrator 32, in response whereto multivibrator 32 produces a pulse of duration $t_0$ for rendering transistor 11 non-conducting. Upon the expiration of the pulse of duration $t_0$, transistor 11 will be conducting again, ignition voltage $u_1$ from source 10 will be applied across electrode and workpiece and it will again be possible to measure the ignition retarding period. As the pulse $t_0$ is produced either upon the expiration of a complete discharge in response to the reception of the pulse of duration $t_e$ from multivibrator 25, or directly upon the detection of a too short ignition retarding period $t_d$, the loss of time due to the discontinuation of the voltage pulses will be minimized. In such a situation the term isoenergetic system is applicable.

To allow the realisation of a complete discharge directly after the occurrence of a shortcircuit during a pulse interval, a series arrangement of a resistor 34, a battery 35 and a diode 36 is provided, in which diode 36 has its anode connected to ground and hence to workpiece 15, and resistor 34 has one of its terminals connected to electrode 14. If shortcircuit between electrode and workpiece occurs during the pulse interval, a current from battery 35 will flow though resistor 34, electrode 14, workpiece 15 and diode 36, so that the voltage at the terminal of resistor 34 connected to electrode 14 will be zero. If no shortcircuit occurs, the voltage at the respective terminal of resistor 34 will be equal to the voltage of battery 35, $U_a$. The aforesaid terminal of resistor 34 is connected to a circuit 37 dimensioned to produce, in response to the occurrence of zero voltage at the terminal in question during a pulse interval following a properly completed discharge pulse, a single output pulse which is applied to the second input terminal of NOR-gate 24 and which ensures that, irrespective of the duration of $t_d$, NOR-gate 24 produces an output signal capable of releasing monostable multivibrator 25, so that a complete discharge can take place.

It will be clear that only the essentialities of an example of a circuit arrangement for performing the method according to the invention are discussed and shown in the block diagram and that the actual electronic circuitry requires a large number of additional facilities, all known to the worker in the art, for ensuring that the circuitry will operate in the manner contemplated. It will further be clear that there are various other possibilities of constructing a circuit arrangement capable of performing the method according to the invention. The only essential point is that, in accordance with the invention, the duration of the ignition retarding period $t_d$ is measured and compared to a preset duration and, in the event of ignition retarding periods shorter than the preset duration, the ignition voltage pulse is inhibited, thereby at any rate preventing the occurrence of a complete discharge. Only in the event of a shortcircuit occurring during a pulse interval, the next successive discharge will be allowed to take place completely, irrespective of the duration of the ignition retarding period.

What I claim:

1. A method for the prevention of arcing in a spark erosion process, in which a pulse-shaped voltage is applied between an electrode and an electrically conducting workpiece, which voltage has a first, predetermined amplitude during a variable ignition retarding period determined by the process parameters, and on the termination of said ignition retarding period a discharge takes place between the electrode and the workpiece, resulting in the flow of a pulse-shaped current and in the voltage dropping to a second amplitude determined by the process, characterized by determining during each pulse interval whether a short circuit between the electrode and workpiece has occurred and, upon the detection of such a short circuit, permitting the next successive voltage pulse to be generated without being suppressed or terminated irrespective of the duration of the ignition retarding period exhibited by said pulse, sensing the ignition retarding period and terminating the voltage in response to the absence of a short circuit if the retarding period is less than a predetermined value; and characterized further in that on the termination of the ignition retarding period a first current of relatively low amplitude will flow for a first, relatively short period of time and that a second current of an amplitude a selected amount greater than that of said first current will be added to said first current in response to the ignition retarding period being found to exceed said predetermined duration.

2. A method according to claim 1 characterized in that the interval between successive voltage pulses is of predetermined, constant duration and that, in the event of termination of a voltage pulse due to a too short ignition retarding period exhibited thereby, the period of time between the termination of said voltage pulse and the beginning of the next successive voltage pulse is equal to said constant duration.

3. In a method for the prevention of arcing in a spark erosion process, in which a pulse-shaped voltage is applied between an electrode and an electrically conductive workpiece, which voltage has a first, predetermined amplitude during a variable ignition retarding period determined by the process parameters, and on the termination of said ignition retarding period a discharge takes place between the electrode and the workpiece, resulting in the flow of a pulse-shaped current and in the voltage dropping to a second smaller amplitude, which is determined by the process, an improvement including the steps of:

determining during each pulse interval whether a short circuit has occurred between the electrode and the workpiece;
terminating voltage pulses exhibiting an ignition retarding period shorter than a predetermined duration when such a short circuit is absent;
upon the detection of such a short circuit, allowing the next successive voltage pulse to be generated without being terminated irrespective of the duration of the ignition retarding period exhibited by said pulse;
generating a first current of relatively low amplitude that flows for a first, relatively short period of time on the termination of the ignition retarding period; and
adding a second current of an amplitude of a selected amount greater than said amplitude of said first current to said first current in response to the ignition retarding period being found to exceed said predetermined duration.

4. A method according to claim 3 wherein the interval between successive voltage pulses is of a predetermined, constant duration and that, in the event of termination of a voltage pulse due to a too short ignition retarding period exhibited thereby, the period of time between the termination of said voltage pulse and the beginning of the next successive voltage pulse is equal to said constant duration.

5. A method of prevention of arcing between an electrode and a conductive workpiece including the steps of:

sensing the presence or absence of a short circuit between the electrode and the workpiece;
applying a voltage of a first amplitude between the electrode and the workpiece;
sensing a breakdown of the voltage to a lower amplitude and applying in response thereto a first current pulse having an amplitude less than that needed to sustain an arc to the workpiece;
comparing the width of the voltage pulse before said breakdown to a predetermined value;
terminating the voltage pulse in the event that the width thereof prior to breakdown was less than the predetermined value provided that a short circuit has not been detected;
applying a second current pulse to the workpiece a after the first current pulse has been applied, said second current pulse having an amplitude greater than that needed to sustain an arc, in response to a sensed short circuit or in response to the width of the voltage pulse prior to breakdown exceeding the predetermined value; and
terminating generation of the second current pulse for the duration of a continuously sensed short circuit after a single second current pulse has been applied to the workpiece in response to said sensed short circuit.

6. A method according to claim 5 wherein the interval between successive voltage pulses is of a predetermined, constant duration and that, in the event of termination of a voltage pulse, the period of time between the termination of said voltage pulse and the beginning of the next successive voltage pulse is equal to said constant duration.

* * * * *